US012128695B2

(12) United States Patent
Hori

(10) Patent No.: US 12,128,695 B2
(45) Date of Patent: Oct. 29, 2024

(54) PRINTING DEVICE

(71) Applicant: CASIO COMPUTER CO., LTD., Tokyo (JP)

(72) Inventor: Masahiro Hori, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 180 days.

(21) Appl. No.: 17/876,410

(22) Filed: Jul. 28, 2022

(65) Prior Publication Data

US 2023/0036603 A1 Feb. 2, 2023

(30) Foreign Application Priority Data

Jul. 30, 2021 (JP) ................................. 2021-125519

(51) Int. Cl.
*B41J 29/387* (2006.01)
*B41J 19/04* (2006.01)
*B41J 29/02* (2006.01)

(52) U.S. Cl.
CPC ............. *B41J 29/387* (2013.01); *B41J 19/04* (2013.01); *B41J 29/02* (2013.01)

(58) Field of Classification Search
CPC . B41J 29/393; B41J 19/04; B41J 29/02; B41J 29/387; B41J 29/38
See application file for complete search history.

(56) References Cited

FOREIGN PATENT DOCUMENTS

| | | |
|---|---|---|
| JP | 1993-031912 A | 2/1993 |
| JP | 2003-019850 A | 1/2003 |
| JP | 2003-075932 A | 3/2003 |
| JP | 2021-037691 A | 3/2021 |

OTHER PUBLICATIONS

JPO; Application No. 2021-125519; Notice of Reasons for Refusal dated Jun. 6, 2023.

*Primary Examiner* — Julian D Huffman
(74) *Attorney, Agent, or Firm* — Fitch, Even, Tabin & Flannery LLP

(57) ABSTRACT

A printing device includes a casing that houses a carriage; a state indicator configured to indicate a non-grounded state in which the casing is not grounded; and a preventer configured to prevent the carriage from moving when the state indicator indicates the non-grounded state.

5 Claims, 7 Drawing Sheets

PRINTING DEVICE

CROSS-REFERENCE TO RELATED APPLICATIONS

This application is based upon and claims the benefit of priority under 35 USC 119 of Japanese Patent Application No. 2021-125519 filed on Jul. 30, 2021, the entire disclosure of which, including the description, claims, drawings, and abstract, is incorporated herein by reference in its entirety.

TECHNICAL FIELD

The present disclosure relates to a printing device.

BACKGROUND

A carriage of a printing device (e.g., inkjet printer) accounts for a larger portion of the device weight as the device becomes more compact. If the device is dropped and receives an impact in the direction in which the carriage is movable, the carriage may move and damage the carriage itself, driving parts of the carriage, or other parts of the device.

According to JP2003-19850A, an image forming device includes a carriage fastening mechanism. The mechanism is configured to lock (fasten) the carriage with a rod that rotates according to the attachment/detachment of a paper-feeding tray. In carrying the image forming device, a user detaches the paper-feeding tray to lock the carriage and prevent damage to the carriage.

SUMMARY

According to an aspect of the present invention, there is provided a printing device including: a casing that houses a carriage; a state indicator configured to indicate a non-grounded state in which the casing is not grounded; and a preventer configured to prevent the carriage from moving when the state indicator indicates the non-grounded state.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein.

DESCRIPTION OF EMBODIMENTS

Hereinafter, an embodiment of the printing device according to the present disclosure is described with reference to FIG. 1 to FIG. 9B.

The embodiment described below is provided with various limitations technically preferable for carrying out the present invention. However, the scope of the present invention is not limited to the embodiment below or illustrated examples.

In the embodiment described below, the printing device is a nail printing device that performs printing on fingernails (printing target) as an example. However, the printing target of the printing device in the present disclosure is not limited to fingernails. The printing target may be toenails. The printing target may be other than nails, such as nail tips and surfaces of various types of accessories.

Figure 1:
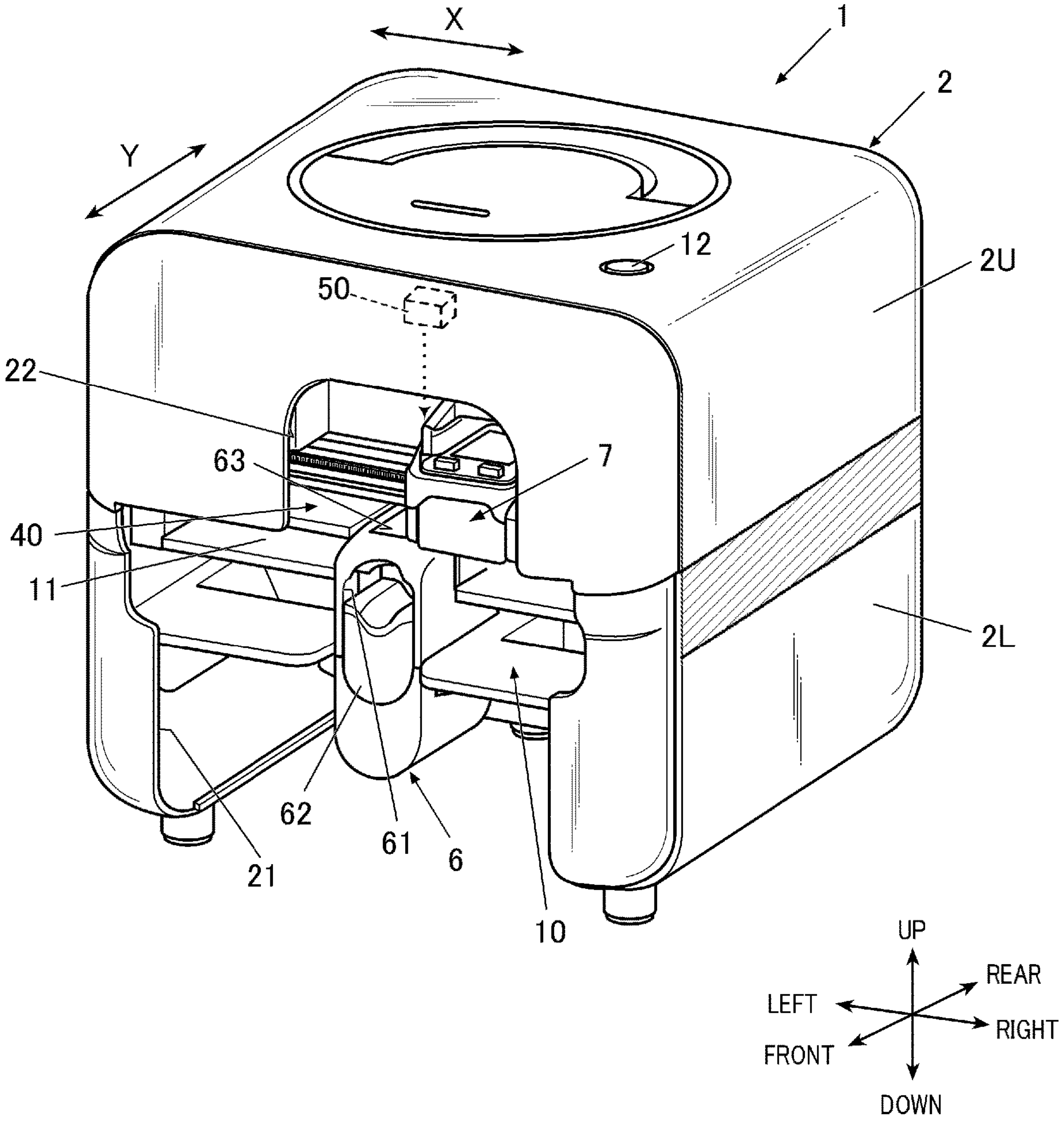
FIG. 1 is a perspective external view of main parts of a printing device according to an embodiment.

FIG. 1 is a perspective external view of main parts of the printing device 1.

In the following description of the embodiment, the up-down direction (upward and downward), the right-left direction, and the front-rear direction (forward and backward) refer to the directions shown in the figures. The X direction is the right-left direction, and the Y direction is the front-rear direction.

The printing device 1 includes a substantially box-shaped casing 2, as shown in FIG. 1.

The casing 2 includes an upper casing 2U that constitutes the upper half of the casing 2 and a lower casing 2L that constitutes the lower half of the casing 2.

The casing 2 has an opening 21 formed on the nearly entire surface of the lower section of the front surface of the casing 2 (front surface side of the printing device 1, front side in FIG. 1) in the right-left direction (horizontal direction of the printing device 1, right-left direction in FIG. 1, X direction). Around the central part of the casing 2 in the right-left direction, a cut-off portion 22 that continuously extends upward from the opening 21 is formed. The cut-off portion 22 is an entrance/exit for a cartridge 7 to be attached to/detached from the device. The cartridge 7 is described later.

The casing 2 may include a cover for covering the opening 21 and the cut-off portion 22, which are not illustrated. The cover may be a member separate from the casing 2 or may be a member attached to the casing 2 with a hinge, for example such that the cover is opened and closed.

On the upper surface (top plate) of the casing 2 (upper casing 2U), an operation receiver 12 of the printing device 1 is provided. The operation receiver 12 is, for example, an operation button (power switch button) for turning on/off the printing device 1.

The shapes and arrangements of parts of the casing 2 are not limited to the illustrated example but can be determined as desired. For example, the operation receiver 12 may be provided on a surface different from the upper surface of the casing 2, such as the lateral surface or the back surface. The casing 2 may be provided with various other operation buttons as the operation receiver 12; a display; an indicator; and so forth.

The casing 2 houses a device body 10.

The device body 10 includes a base 11, a finger holder 6 attached to the base 11, an imaging unit 50 that images the nail (printing target), and a printing unit 40 that performs printing on the nail.

The finger holder 6 is disposed at nearly the center of the base 11 in the right-left direction (X direction) at the front surface side of the device. The finger holder 6 fastens the printing finger (finger having the nail as the printing target in this embodiment) within a region appropriate for printing.

The finger holder 6 has an opening 61 at the front surface side of the device. Inside the finger holder 6, a finger holding member 62 is provided. The finger holding member 62 pushes up and supports the finger inserted from the opening 61. The finger holding member 62 is made of a flexible resin, for example.

On the upper surface of the finger holder 6, a window 63 is formed. The window 63 exposes the nail part of the finger inserted from the opening 61 and held by the finger holding member 62.

The imaging unit 50 is disposed on the inside of the upper surface (top plate) of the upper casing 2U so as to be above the window 63 of the finger holder 6. The imaging unit 50 images the nail (the finger having the nail), which is exposed through the window 63, to obtain an image of the nail.

Figure 3:
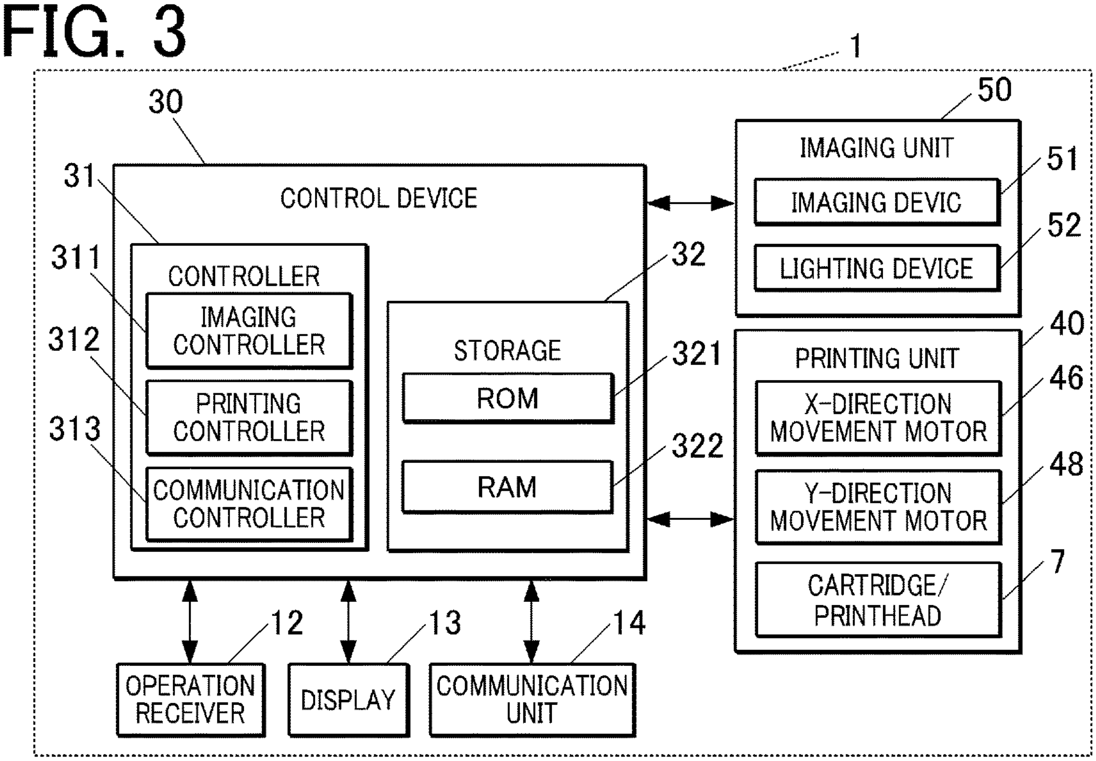
FIG. 3 is a block diagram showing a schematic control system of the printing device according to the embodiment.

The imaging unit 50 includes an imaging device 51 (e.g., a camera) and a lighting device 52 (e.g., a white light-emitting device (LED)) that illuminates the nail as the imaging target (see FIG. 3). The imaging device 51 is a small camera that includes a lens and a solid state image sensor having two million pixels or more, such as a charge coupled device (CCD) or a complementary metal oxide semiconductor device (CMOS), for example.

The position of the imaging unit 50 is not limited to a specific position as long as the imaging unit 50 can image the fingernail placed on the finger holder 6. For example, the imaging unit 50 may be movable in the X and Y directions by a movement mechanism that moves the cartridge 7.

Figure 2:
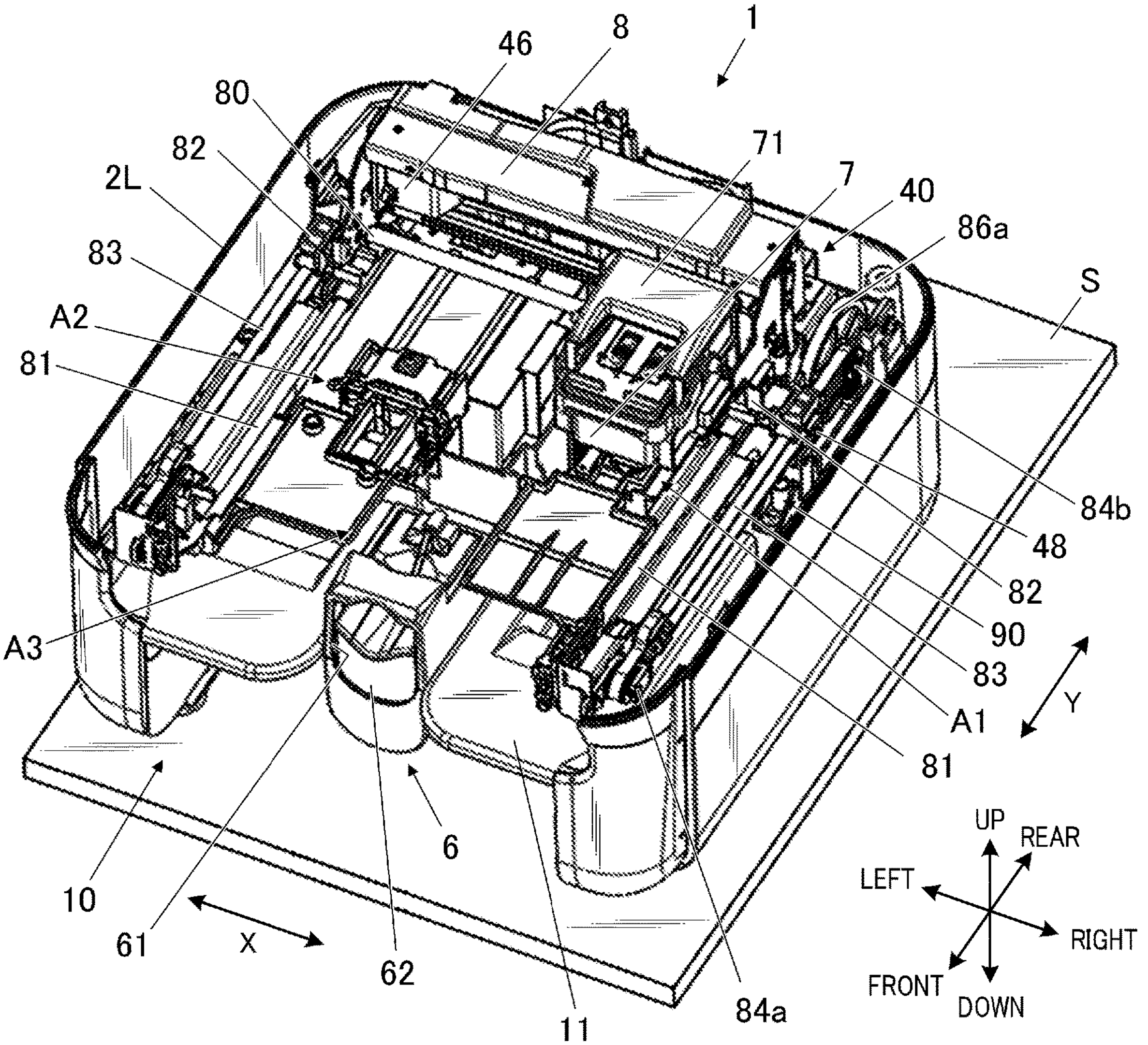
FIG. 2 is a perspective view of main parts of the printing device without an upper casing according to the embodiment.

FIG. 2 is a perspective view of main parts of the printing device 1 without the upper casing 2U.

As shown in FIG. 2, the printing unit 40 includes the cartridge 7 that functions as a print head; a cartridge holder 71 that holds the cartridge 7; a carriage 8 that supports the cartridge holder 71 such that the cartridge holder 71 is movable in the X direction; an X-direction movement motor 46; and a Y-direction movement motor 48.

The cartridge 7 is a head integrated with a cartridge and functions as a print head. The cartridge 7 is an inkjet head that performs printing by jetting minute ink droplets to the printing target from the ink jetting part at the bottom surface. The cartridge 7 in this embodiment is configured to jet inks of various colors, such as cyan (C), magenta (M), and yellow (Y). The colors of inks are not limited to these, though.

The cartridge holder 71 detachably holds the cartridge 7.

The cartridge holder 71 is supported on the front part of the carriage 8 so as to be movable in the X direction. The carriage 8 includes an X-direction rail 80 that extends in the right-left direction. The carriage 8 is mounted with the X-direction movement motor 46. The X-direction rail 80 is inserted through the back part of the cartridge holder 71. The cartridge holder 71 is movable on the carriage 8 in the X direction along the X-direction rail 80 according to the rotation of a not-illustrated drive belt that is driven by the X-direction movement motor 46.

The carriage 8 is an example of the printing means in the present disclosure. The carriage 8 has a rectangular box shape and is long in the right-left direction (X direction). Both the right and left ends of the carriage 8 are supported by the respective Y-direction rails 81.

The Y-direction rails 81 extend in the Y direction and support the carriage 8 such that the carriage 8 is movable in the Y direction.

Both the right and left ends of the carriage 8 are connected to respective timing belts 83 via belt clips 82.

Each of the timing belts 83 extends in the Y direction and is stretched around two pulleys 84*a*, 84*b* at the front and rear. The front pulley 84*a* is the driven pulley, and the rear pulley 84*b* is the driving pulley.

Among the right and left timing belts 83, the right timing belt 83 is at the main (driving) side and is connected to the Y-direction movement motor 48. Specifically, the right-rear pulley 84*b* (driving pulley), around which the right timing belt 83 is stretched, includes a gear wheel 86*a* that is integrated with the pulley 84*b*. The gear wheel 86*a* engages with an intermediate gear wheel 86*b*. Via the gear wheels 86*a*, 86*b*, the right-rear pulley 84*b* is connected to the Y-direction movement motor 48. The left timing belt 83 is the driven side. The rotation speed and rotation amount of the left driven side is synchronized with that of the right driving side via a not-illustrated connection shaft that connects the right and left pulleys 84*b*.

The Y-direction movement motor 48 drives the rear pulleys 84*b* to rotate, so that the timing belts 83 rotate. Accordingly, the carriage 8 can move in the Y direction while being supported by the Y-direction rail 81.

The right-rear side of the base 11 is the home position A1 where the cartridge 7 (cartridge holder 71) stands by when printing is not performed. At the home position A1, a non-illustrated cap is provided that covers and protects the ink ejection surface (bottom surface of the cartridge 7) from drying and so forth. When the cartridge 7 is at the home position A1, the carriage 8 is at the rear end of its moving range in the Y direction.

The left-rear side of the base 11 is the maintenance region A2 where maintenance (e.g., cleaning) of the cartridge 7 is performed when printing is not performed. The maintenance region A2 has a purging unit that performs purging (spitting); a wiping unit that wipes the ink ejection surface; and a scraping unit that scrapes off ink adhering to a wiping member of the wiping unit, which are not illustrated.

The central region in the right-left direction of the front side of the base 11 is the printing region A3 where the cartridge 7 performs printing operation in printing. The printing region A3 corresponds to the window 63 of the finger holder 6.

The cartridge 7 is movable in the X direction on the carriage 8, and the carriage 8 is movable in the Y direction. This allows the cartridge 7 to move on an X-Y plane region that at least includes the home position A1, the maintenance region A2, and the printing region A3.

FIG. 3 is a block diagram showing the schematic control system of the printing device 1.

As shown in FIG. 1, the printing device 1 includes a display 13, a communication unit 14, and a control device 30, as well as the above-described operation receiver 12, the printing unit 40, and the imaging unit 50.

The display 13 consists of a liquid crystal display (LCD), an organic electro-luminescence display (ELD), or other flat displays, for example. The display 13 displays various kinds of information in accordance with display commands from the control device 30.

The communication unit 14 sends and receives data wirelessly or via cables, such as network lines. The communication method of the communication unit 14 is not limited to a specific one. The communication unit 14 may communicate over a network line (e.g., the Internet) or may communicate wirelessly in accordance with a near field communication protocol, such as Bluetooth (registered trademark) and Wi-Fi.

The control device 30 is a computer that includes a controller 31 and a storage 32. The controller 31 is a processor consisting of a not-illustrated central processing unit (CPU), for example. The storage 32 includes a not-illustrated read-only memory (ROM) 321 and a not-illustrated random access memory (RAM) 322.

The storage 32 stores various programs, data, and so forth for operating the printing device 1.

Specifically, the ROM 321 of the storage 32 stores various programs including a printing program to perform the printing process. The control device 30 executes these programs to centrally control the components of the printing device 1.

The controller 31 includes functional components such as an imaging controller 311, a printing controller 312, and a communication controller 313. The functions of these functional components are achieved by the cooperation of the CPU of the controller 31 and the programs stored in the ROM 321 of the storage 32.

The imaging controller 311 controls the imaging device 51 and the lighting device 52 of the imaging unit 50 to obtain an image of the printing finger held by the finger holder 6. The image data obtained by the imaging unit 50 is stored in the storage 32.

The printing controller 312 generates printing data on the basis of the image data. The printing controller 312 also outputs control signals to the printing unit 40 on the basis of the printing data, and performs printing in accordance with the printing data by controlling the X-direction movement motor 46 and the Y-direction movement motor 48 of the printing unit 40, the cartridge 7, and so forth.

The communication controller 313 performs various kinds of data communication by controlling operation of the communication unit 14.

The printing device 1 may be configured to communicate with a not-illustrated terminal device as a user interface. The terminal device is a portable device, such as a smartphone or a tablet. The terminal device is not limited to a specific type as long as it is capable of communicating with the printing device 1. For example, the terminal device may be a desktop/notebook personal computer or a gaming terminal device.

Next, a lock mechanism 90 that prevents the carriage 8 from moving is described.

Figure 4:
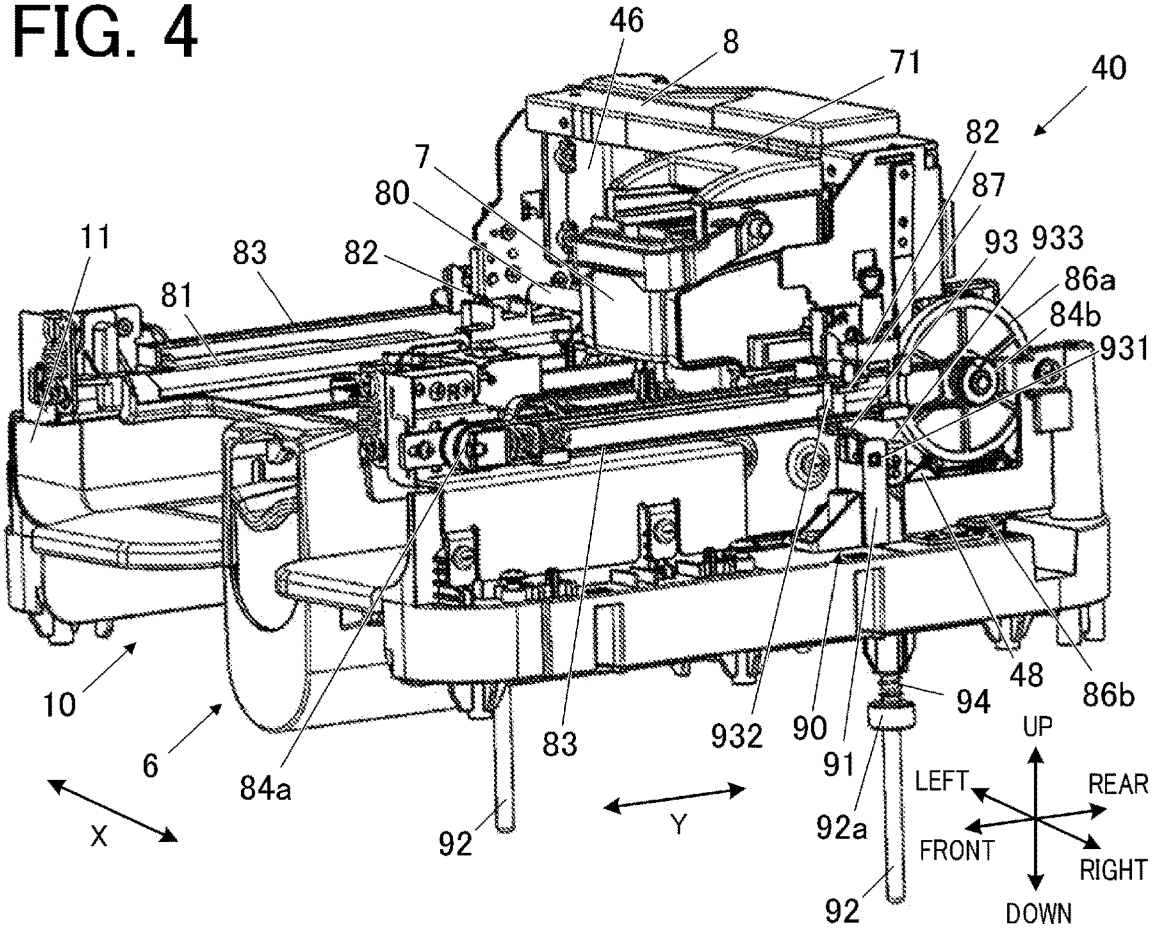
FIG. 4 is a perspective view of the body of the printing device in the embodiment, wherein the casing is in a non-grounded state.
Figure 5:
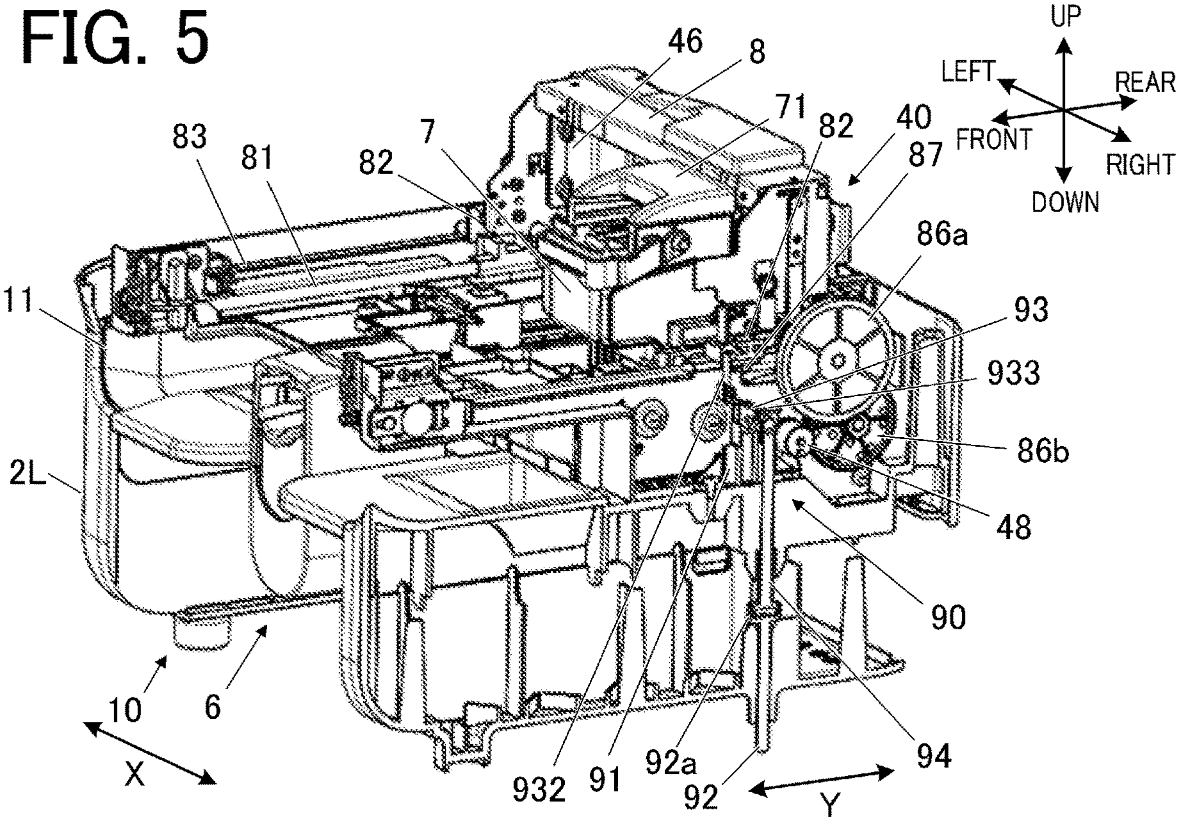
FIG. 5 is a vertical section of the printing device without the upper casing along the vertical section of a lock mechanism, wherein the casing is in the non-grounded state.
Figure 6:
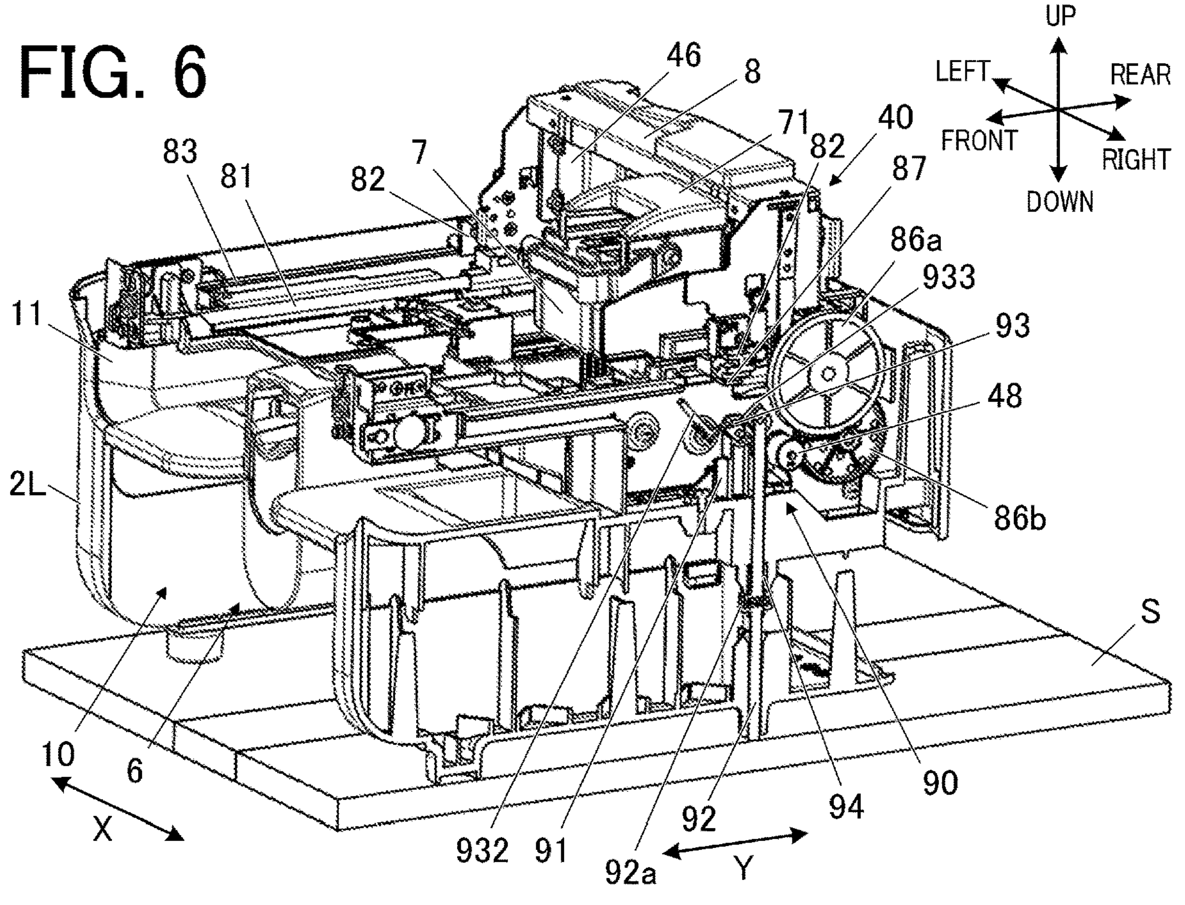
FIG. 6 is a vertical section of the printing device without the upper casing along the vertical section of the lock mechanism, wherein the casing is in a grounded state.

FIG. 4 is a perspective view of the device body 10. FIG. 5 and FIG. 6 show the vertical section of the printing device 1 without the upper casing 2U along the vertical section of the lock mechanism 90. FIG. 4 and FIG. 5 show a non-grounded state where the casing 2 (lower casing 2L) is not grounded. FIG. 6 shows a grounded state where the lower casing 2L is grounded on a substantially horizontal setting table S. FIG. 7 to FIG. 9B are figures for explaining operation of the lock mechanism 90.

Two lock mechanisms 90 are provided at both right and left sides of the device body 10. These two lock mechanisms 90 are configured symmetrically and operate in the same manner. In the following, only the right or left lock mechanism 90 is described, and the other is not described. FIG. 4 to FIG. 9B show the lock mechanism 90 at the right side of the device body 10.

The carriage 8, equipped with the X-direction movement mechanism of the cartridge 7, is relatively heavy in the printing device 1. Assume that the device in which the carriage 8 is simply stopped is dropped when printing is not performed. If the carriage 8 receives the impact force in its movable direction (Y direction in which the carriage 8 is movable along the Y-direction rail 81), the carriage 8 may suddenly accelerate in the Y direction. This may damage the carriage 8 as well as the driving mechanism of the carriage 8 (the Y-direction movement motor 48, the Y-direction rails 81, the belt clips 82, and other mechanisms that movably support the carriage 8).

The printing device 1 in this embodiment includes lock mechanisms 90 as shown in FIG. 4 to FIG. 6. The lock mechanisms 90 prevent the carriage 8 from moving when the casing 2 is in the non-grounded state.

The lock mechanisms 90 are provided at both right and left sides of the device body 10. The lock mechanisms 90 are configured to prevent the carriage 8 from moving in the direction in which the carriage 8 is movable (Y direction) by engaging with the respective right and left ends of the carriage 8. The respective lock mechanisms 90 are disposed at the rear side of the device body 10 in the Y direction. The lock mechanisms 90 are configured to prevent the carriage 8 from moving when the carriage 8 is at the rear end of its moving range in the Y direction.

Specifically, each of the lock mechanisms 90 includes a guide base 91, a rod 92, and a lock plate 93.

The guide base 91 is disposed on the base 11 and supports the rod 92 and the lock plate 93.

The rod 92 is disposed to extend in the up-down direction. The rod 92 is supported by the lower casing 2L and the guide base 91 such that the rod 92 can move in the up-down direction and such that the lower end of the rod 92 can protrude from the bottom surface of the casing 2 (lower casing 2L). The rod 92 is movable in the up-down direction within the range between (i) the state where a certain length of the lower end of the rod 92 protrudes from the bottom surface of the lower casing 2L (the state shown in FIG. 5) and (ii) the state where the lower end of the rod 92 is flush with the bottom surface of the lower casing 2L (the state shown in FIG. 6).

At around the middle height of the rod 92, a large-diameter part 92*a* is formed. On the upper side of the large-diameter part 92*a*, a coil spring 94 is wound around the rod 92. The coil spring 94 (biasing applier) pushes the large-diameter part 92*a* downward, thereby biasing the rod 92 downward toward the lower casing 2L. The total biasing force of the coil springs 94 of the two lock mechanisms 90 is at least smaller than the weight of the device body 10.

The rod 92 is for detecting/indicating the non-grounded state of the casing 2 (lower casing 2L). The rod 92 is an example of the state indicator in the present disclosure. The upward/downward movement of the rod 92 allows detection of the grounded state and the non-grounded state. In the grounded state, a certain part of the bottom surface of the lower casing 2L (part where the rod 92 is inserted) is grounded on the setting table S, as shown in FIG. 6. In the non-grounded state, the certain part is not grounded on the setting table S, as shown in FIG. 5.

In the grounded state, the moving range of the rod 92 is between (i) the state where the lower end of the rod 92 is flush with the bottom surface of the lower casing 2L and (ii) the state where a certain length of the lower end of the rod 92 protrudes from the bottom surface of the lower casing 2L. That is, the grounded state includes a state where the casing 2 (printing device 1) leans forward or backward from the horizontal state by an angle within a certain range.

On the other hand, in the non-grounded state, the lower end of the rod 92 protrudes further downward beyond the moving range of the rod 92 in the grounded state.

The lock plate 93 is configured to swing upward and downward according to the up-down movement of the rod 92 and prevent the carriage 8 from moving. The lock plate 93 is an example of the preventer in the present disclosure.

The lock plate 93 has a swing shaft 931 that extends in the right-left direction. The swing shaft 931 is at the nearly central part in the right-left direction of the lock plate 93 and is supported by the guide base 91.

On the front part of the lock plate 93, a lock pin 932 is erected. The lock pin 932 is configured to abut the carriage 8 to prevent the carriage 8 from moving. As described below, the lock pin 932 is configured to be in a standing state and a lying state. In the standing state, the lock pin 932 stands in front of an engaging member 87 that protrudes at the lateral surface side of the carriage 8. In the lying state, the lock pin 932 lies below the engaging member 87.

Figure 7A:
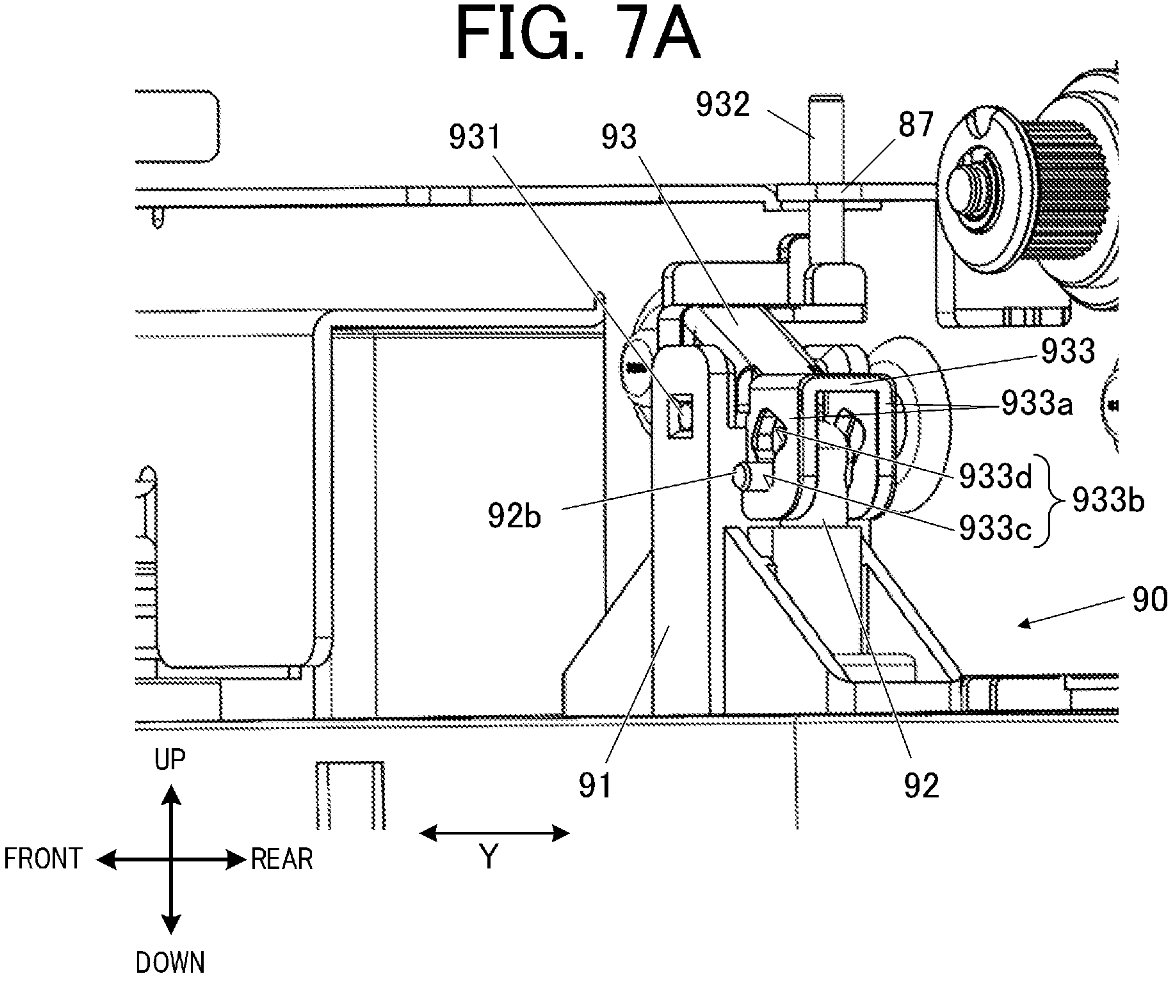
FIG. 7A is a figure to explain operation of the lock mechanism according to the embodiment.
Figure 7B:
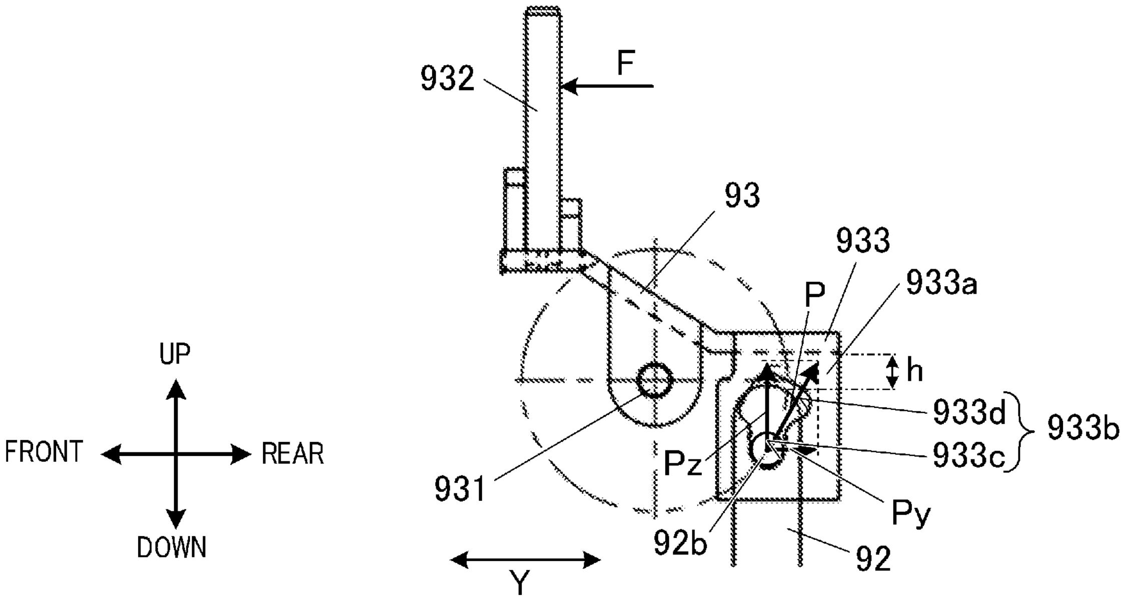
FIG. 7B is a figure to explain operation of the lock mechanism according to the embodiment.
Figure 8A:
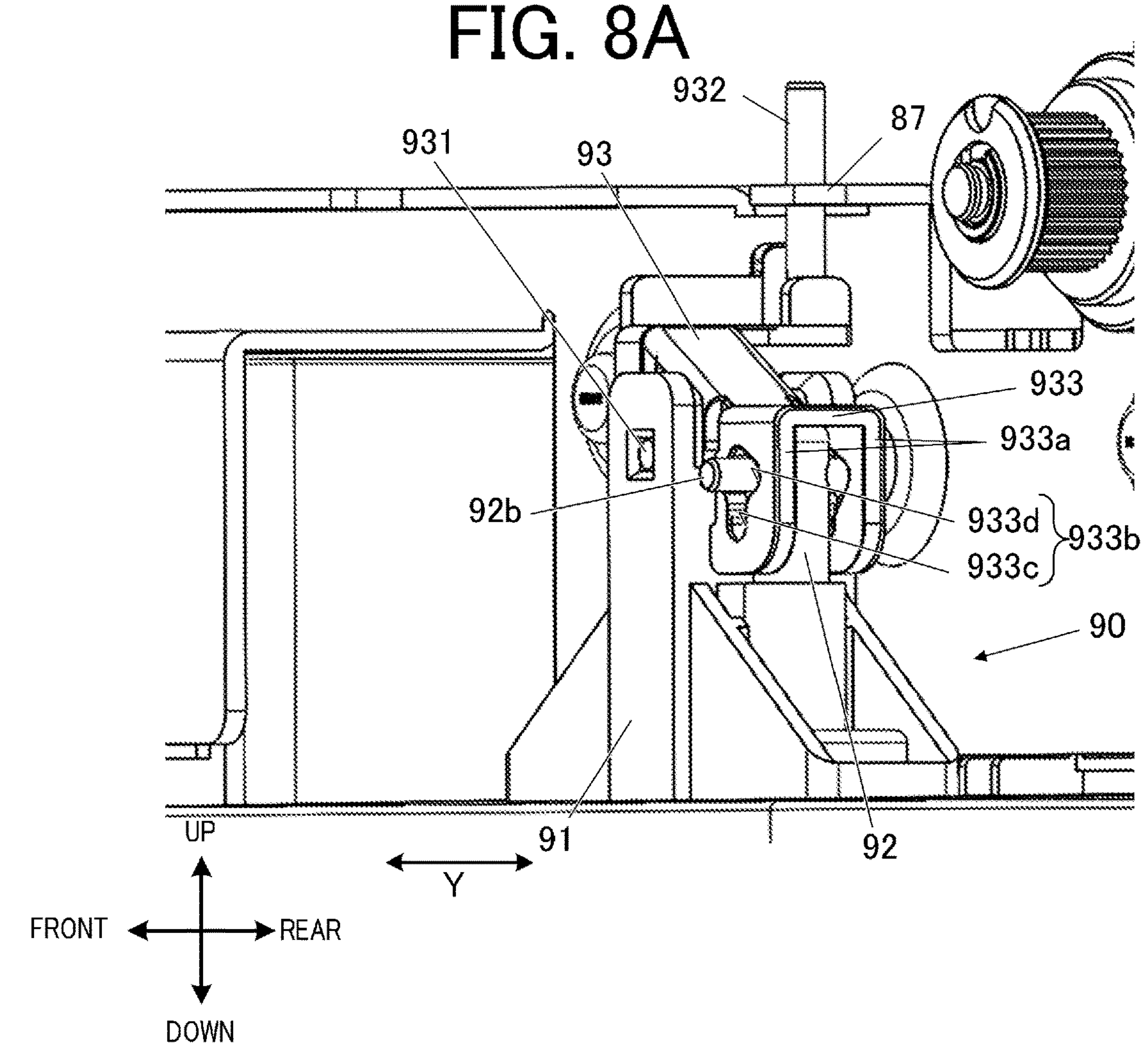
FIG. 8A is a figure to explain operation of the lock mechanism according to the embodiment.
Figure 8B:
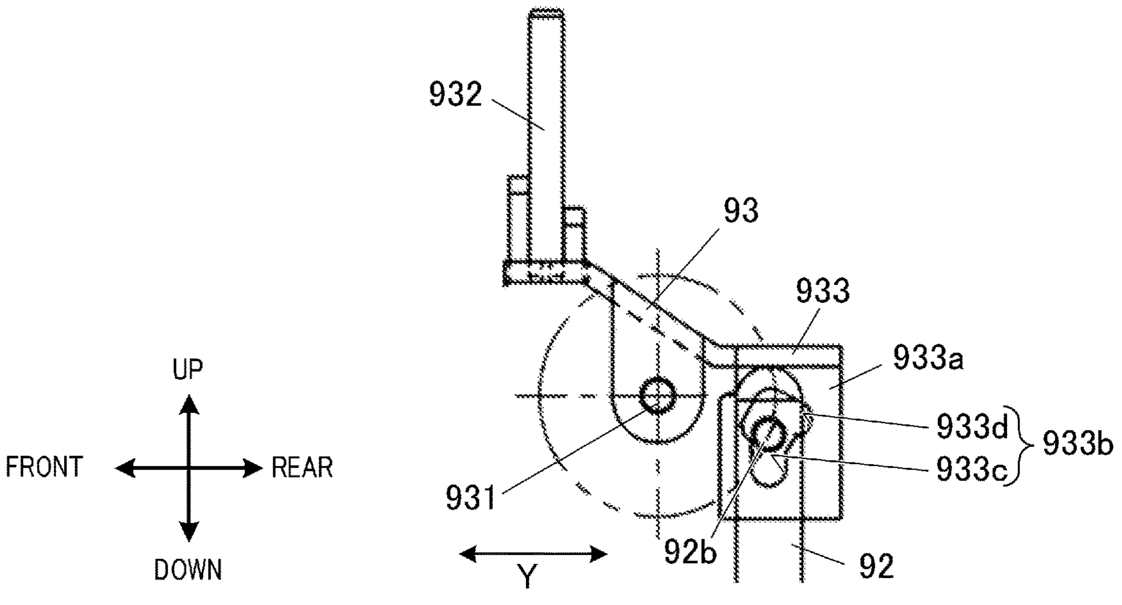
FIG. 8B is a figure to explain operation of the lock mechanism according to the embodiment.

The rear part of the lock plate 93 is a pushed part 933, as shown in FIG. 7A, FIG. 7B. The pushed part 933 is configured to be in contact with the upper end of the rod 92 and be pushed up by the rod 92.

The pushed part 933 has guide holes 933*b* at both right and left walls 933*a*. Through the guide holes 933*b*, a protrusion 92*b* of the rod 92 is inserted. The guide holes 933*b* are formed to guide the protrusion 92*b*. The protrusion 92*b* protrudes rightward and leftward from the upper end part of the rod 92.

The guide holes 933*b* are configured to prevent the lock plate 93 from swinging, depending on the position of the rod 92 in the up-down direction. Specifically, each of the guide holes 933*b* has a U-shaped lower hole 933*c* and an upper hole 933*d*. The width of the lower hole 933*c* in the front-rear direction is approximately the size of the protrusion 92*b*. The upper hole 933*d* connects to the upper part of the lower hole 933, and the width of the upper hole 933*d* in the front-rear direction is wider than that of the lower hole 933*c*. When the lock pin 932 of the lock plate 93 is in the standing state as shown in FIG. 7A to FIG. 8B, the lower hole 933*c* is at the rear and lower side of the swing shaft 931.

According to the lock mechanism 90 as configured above, when (i) the carriage 8 is in the non-printing state and positioned at the rear end of its moving range in the Y direction and (ii) the bottom surface of the casing 2 (lower casing 2L) is not grounded on the setting table S, the rod 92 moves downward by the biasing power of the coil spring 94. Thus, the non-grounded state of the casing 2 is detected (see FIG. 5).

In the non-grounded state, the protrusion 92*b* at the upper end of the rod 92 fits in the lower hole 933*c* of the guide hole 933*b* of the lock plate 93 and pulls down the rear part of the lock plate 93, as shown in FIG. 7A, FIG. 7B. This allows the lock plate 93 to swing on the swing shaft 931 such that the front part of the lock plate 93 moves up. Accordingly, the lock pin 932 stands up (standing state). In the standing state, the lock pin 932 stands immediately in front of the engaging member 87, which is at the lateral surface side of the carriage 8. The lock pin 932 thus prevents the carriage 8 from moving forward. Herein, the carriage 8 is in the rear end of its moving range in the Y direction, therefore being prevented from moving backward as well.

The lock mechanism 90 thus prevents the carriage 8 from moving in the Y direction in which the carriage 8 is movable (locked state).

If the printing device 1 in the locked state receives a forward impact (e.g., by being dropped), the forward impact force acts on the relatively heavy carriage 8. The impact force from the carriage 8 (impact force F) is applied to the point of application of the lock pin 932 at which the lock pin 932 abuts the engaging member 87 of the carriage 8. The impact force F acts in the direction of rotating the lock plate 93 and unlocking the lock pin 932.

However, the rotatory force P, which is applied to the protrusion 92*b* of the rod 92 via the lock plate 93 by the impact force F, is divided into a component force Py in the front-rear direction and a component force Pz in the up-down direction. The protrusion 92*b*, which has been fitted in the lower hole 933*c* of the guide hole 933*b* of the lock plate 93, holds back the component force Py and prevents the lock plate 93 from moving in the front-rear direction at the position of the lower hole 933*c* (the position at the rear and lower side of the swing shaft 931).

Thus, even when the impact force F is greater than the biasing force of the coil spring 94, the lock mechanism 90 prevents the lock plate 93 from swinging and appropriately maintains the locked state.

As the bottom surface of the casing 2 in the locked state is closer to the setting table S, the rod 92 moves upward against the biasing power of the coil spring 94. Eventually, the upper end (top end) of the rod 92 abuts the pushed part 933 of the lock plate 93, and the protrusion 92*b* of the rod 92 moves from the lower hole 933*c* into the upper hole 933*d* in the guide hole 933*b* of the lock plate 93. Accordingly, the lock plate 93, which has been prevented from moving in the front-rear direction by the protrusion 92*b*, is unlocked and becomes swingable.

Herein, the distance h (see FIG. 7B) between the upper end of the rod 92 and the pushed part 933 of the lock plate 93 in the locked state is approximately equal to the up-down movement distance for the protrusion 92*b* to get out of the lower hole 933*c*. When the rod 92 is pushed up by approximately the distance h, the upper end of the rod 92 abuts the pushed part 933 of the lock plate 93, so that the lock plate 93 becomes swingable (starts swinging).

Figure 9A:
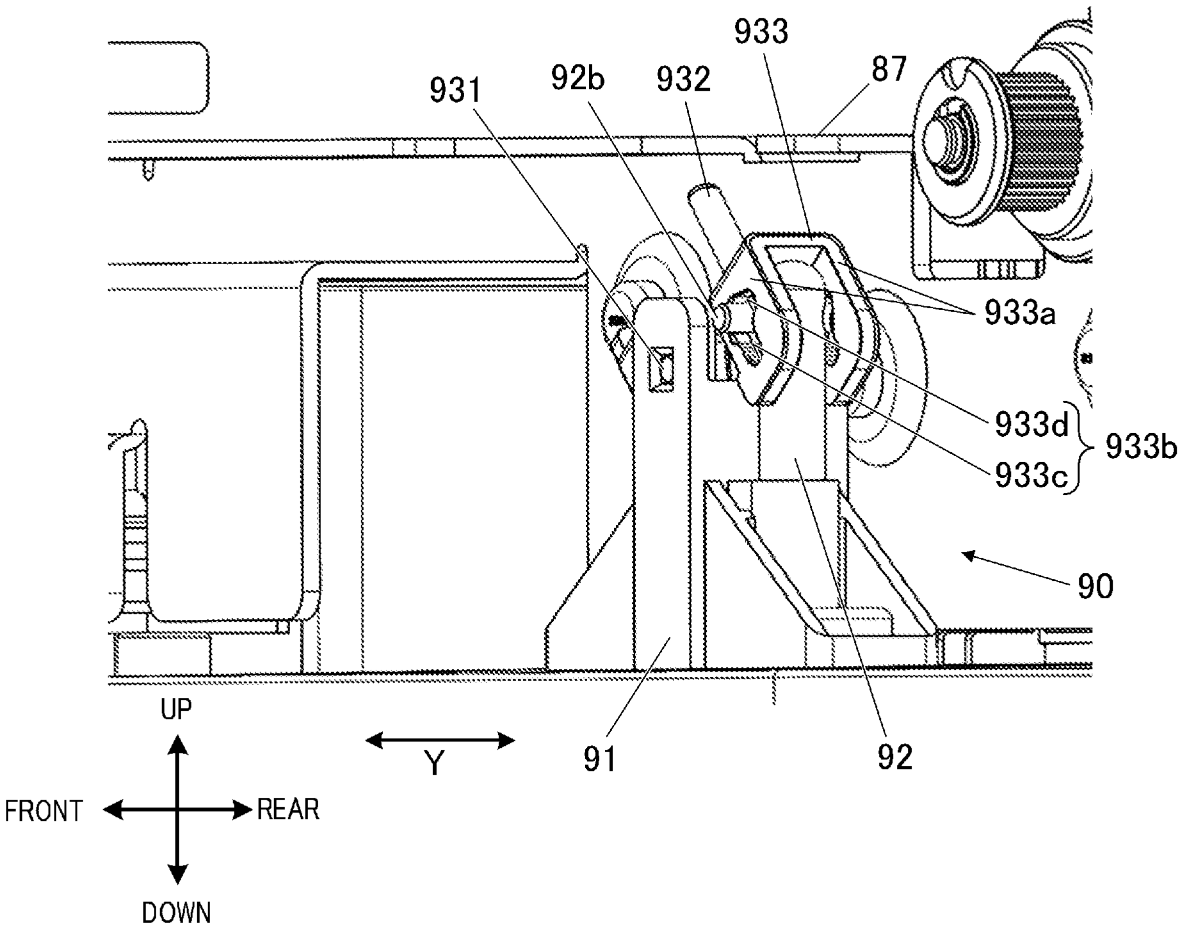
FIG. 9A is a figure to explain operation of the lock mechanism according to the embodiment.
Figure 9B:
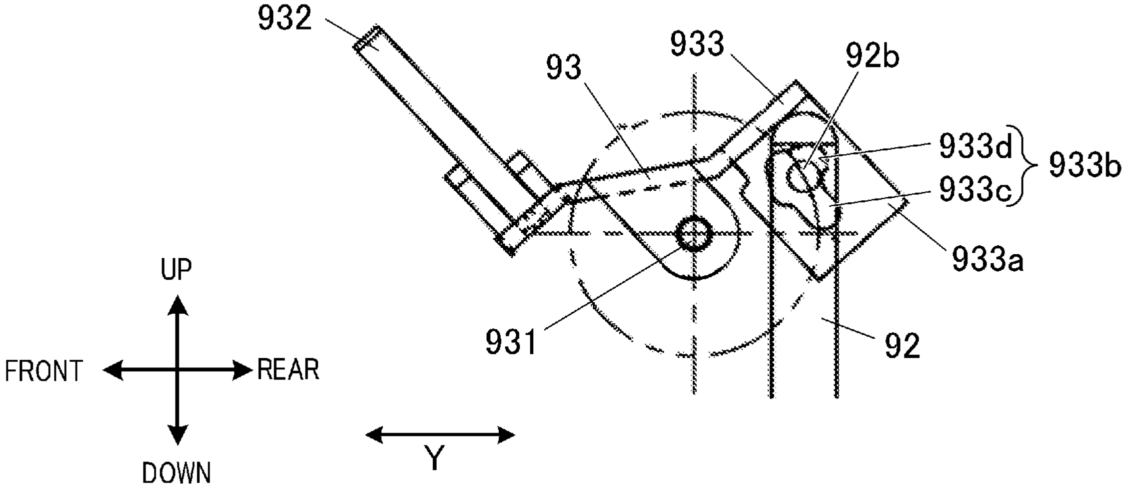
FIG. 9B is a figure to explain operation of the lock mechanism according to the embodiment.

When the bottom surface of the casing 2 is grounded on the setting table S, the rod 92 is further moved upward, and the grounded state is detected. In the grounded state, the upper end of the rod 92 pushes up the pushed part 933 of the lock plate 93 as shown in FIG. 9A, FIG. 9B, so that the lock plate 93 swings on the swing shaft 931 in the direction of leaning the lock pin 932 forward. The lock pin 932 eventually lies below the engaging member 87 of the carriage 8 (lying state). In the lying state, the lock pin 932 does not prevent the carriage 8 from moving forward.

Thus, in this unlocked state, the lock mechanism 90 does not prevent the carriage 8 from moving in the movable direction of the carriage 8 (Y direction).

As described above, according to this embodiment, the carriage 8 is prevented from moving when the non-grounded state of the casing 2 is detected with the rod 92.

In the known art, the sheet feeding tray needs to be removed in order to fasten the carriage. This embodiment, on the other hand, automatically detects the non-grounded state of the casing 2 and fastens the carriage 8 when the device is unexpectedly dropped, for example. This embodiment thus appropriately protects the carriage 8 and prevent damage to the carriage 8 and the driving mechanism of the carriage 8.

In the known art, the carriage may be fastened with tapes or cushioning materials for shipping. This embodiment eliminates the need for such tapes and cushioning materials, therefore saving packing work and unpacking work by the user to remove these tapes/materials.

According to this embodiment, the non-grounded state of the casing 2 is detected with the rod 92, which is supported by the lower casing 2L so as to be able to protrude from the bottom surface of the casing 2 (lower casing 2L).

Thus, the non-grounded state of the casing 2 can be detected with a simple configuration.

Further, according to this embodiment, the lock plate 93 allows the lock pin 932 to be in the standing state in which the lock pin 932 stands up; and the lying state in which the lock pin 932 lies down. When the rod 92 moves downward, the pushed part 933 moves downward, so that the lock pin 932 stands up at a side toward which the carriage 8 is movable (the front side of the carriage 8). When the rod 92 moves upward, the pushed part 933 is pushed upward by the rod 92, so that the lock pin 932 lies below the side toward which the carriage 8 is movable.

According to such a structure, the carriage 8 is prevented from moving when the casing 2 is in the non-grounded state, whereas the carriage is allowed to move when the casing 2 is in the grounded state.

Further, according to this embodiment, the pushed part 933 of the lock plate 93 has the guide hole 933*b* configured to guide the protrusion 92*b* that protrudes from the upper end part of the rod 92. The guide hole 933*b* has the lower hole 933*c* configured to abut the lock plate 93 and prevent the lock plate 93 from swinging; and the upper hole 933*d* connecting to the upper part of the lower hole 933*c* and configured not to prevent the lock plate 93 from swinging.

According to such a configuration, in the locked state, the rod 92 moves downward and the protrusion 92*b* fits in the lower hole 933*c*. Accordingly, the lock plate 93 is prevented from swinging when receiving a force in the direction of rotating the lock plate 93 and unlocking the lock pin 932. Thus, the lock state is appropriately maintained.

Further, according to this embodiment, the rod 92 is biased downward by the coil spring 94.

According to such a configuration, when the casing 2 is in the non-grounded state, the rod 92 swiftly moves downward without being obstructed by the lower casing 2L. This allows appropriate detection of the non-grounded state of the casing 2.

Further, according to this embodiment, the carriage 8 is movable in the Y direction (front-rear direction). When printing is not performed, the carriage 8 is disposed at the rear end of its moving range in the Y direction and prevented from moving forward by the lock plate 93.

According to such a configuration, the lock plate 93 simply prevents the carriage 8 from moving forward, thereby preventing the carriage 8 from moving in the Y direction (the direction in which the carriage 8 is movable).

Further, according to this embodiment, the carriage 8 is longer in the X direction (right-left direction) than in the Y direction (direction in which the carriage 8 is movable), the X direction and Y direction being orthogonal to each other; and the lock mechanisms 90 (lock plates 93) are provided at both right and left sides of the carriage 8 to individually prevent the carriage 8 from moving.

According to such a configuration, the carriage 8 can be kept parallel in the right-left direction even if the carriage 8 receives an impact force that is uneven in the right-left direction. This prevents differences in positions of the pulleys 84*a*, 84*b* and the timing belt 83 between the right and the left (yawing difference that occurs when only the right or left timing belt 83 jumps over the gear of the pulley and the carriage 8 is not parallel in the right-left direction).

Although the embodiment of the present disclosure has been described, the above-described embodiment does not limit the present disclosure and can be variously modified without departing from the scope of the present disclosure.

For example, although the above embodiment includes two lock mechanisms 90 disposed at both right and left sides of the carriage 8, the position and the number of lock mechanisms 90 is not specifically limited. For example, only one lock mechanism 90 may be disposed at the rear side of the carriage 8 in the non-printing state. It is preferable that the lock mechanism 90 be provided at a position close to the center of gravity of the carriage 8 and configured to abut the carriage 8 at around the center of gravity of the carriage 8, no matter how many lock mechanisms 90 are provided.

Further, in the above embodiment, the lock pin 932 moves downward when the rod 92 moves upward, and the lock pin 932 moves upward when the rod 92 moves downward, according to the swing of the lock plate 93. However, the preventer in the present disclosure is not limited to such a lock plate 93. For example, the preventer may be configured to engage with (stop) the carriage 8 when the rod 92 moves downward and not to engage with the carriage 8 when the rod 92 moves upward.

Further, the state indicator of the present disclosure is not limited to a rod (rod 92) that is movable upward and downward. The state indicator may be any member that allows detection of the non-grounded state of the casing.

Further, the detection result obtained with the state indicator may be reflected on the control of the printing device 1. For example, when the casing 2 s in the non-grounded state (or the carriage 8 is prevented from moving), the control device 30 may display an alarm on the display 13.

Further, the printing means in the present disclosure is not limited to a carriage, but may include a print head, for example.

Although the embodiment of the present disclosure has been described, the scope of the present disclosure is not limited to the above-described embodiment but includes the scope of claims and the scope of their equivalents.

What is claimed is:

1. A printing device comprising:

a casing that houses a carriage;

a rod supported by the casing so as to be movable upward and downward and be able to protrude from a bottom surface of the casing and configured to indicate a non-grounded state in which the casing is not grounded; and a preventer configured to prevent the carriage from moving when the rod indicates the non-grounded state, wherein the preventer is supported to be swingable upward and downward on a swing shaft and includes a pushed part configured to abut an upper end of the rod; and a lock pin erected on the preventer, the lock pin and the pushed part being opposite to each other with respect to the swing shaft, wherein when the rod moves downward, the pushed part moves downward, so that the lock pin stands up at a side of the carriage toward which the carriage is movable, wherein when the rod moves upward, the pushed part is pushed upward by the rod, so that the lock pin lies below the side of the carriage toward which the carriage is movable.

2. The printing device according to claim 1, wherein the rod includes a protrusion that protrudes from an upper end part of the rod in a direction parallel to the swing shaft, the pushed part includes a guide hole configured to guide the protrusion, wherein the guide hole includes a lower hole configured to abut the protrusion and prevent the preventer from swinging; and an upper hole connecting to an upper part of the lower hole and configured not to prevent the preventer from swinging.

3. The printing device according to claim 1, further comprising a biasing applier that biases the rod downward.

4. The printing device according to claim 1, wherein the carriage is configured to be movable in a first direction within a level plane, and the carriage is disposed at one end of moving range of the carriage in the first direction when printing is not performed, wherein the preventer is configured to prevent the carriage from moving toward an end opposite the one end in the first direction.

5. The printing device according to claim 1, wherein the carriage is configured to be movable in a first direction within a level plane and is longer in a second direction than in the first direction, the first direction being orthogonal to the second direction on the level plane, wherein the printing device includes preventers each of which is the preventer, the preventers being disposed at both sides of the carriage in the second direction and being configured to individually prevent the carriage from moving at the both sides of the carriage.

* * * * *